United States Patent [19]

Watanabe et al.

[11] Patent Number: 5,432,620
[45] Date of Patent: Jul. 11, 1995

[54] MIXED MODE COMMUNICATION METHOD AND APPARATUS

[75] Inventors: Chieko Watanabe; Akio Matsui, both of Kawasaki, Japan

[73] Assignee: Fujitsu Limited, Kawasaki, Japan

[21] Appl. No.: 914,351

[22] Filed: Jul. 17, 1992

[30] Foreign Application Priority Data

Jul. 22, 1991 [JP] Japan ................... 3-181332

[51] Int. Cl.$^6$ .................................... H04N 1/32
[52] U.S. Cl. ......................... 358/462; 358/442; 358/443; 358/450
[58] Field of Search ............... 358/462, 443, 263, 260, 358/256, 261, 257, 433, 280, 255, 460, 442, 456, 450; 382/41, 9, 16, 48; 379/359, 355; 375/7, 113, 114; 395/147, 146, 148

[56] References Cited

U.S. PATENT DOCUMENTS

| | | | |
|---|---|---|---|
| 4,703,362 | 10/1987 | Deutermann et al. | 358/263 |
| 4,731,826 | 3/1988 | Daie | 379/359 |
| 4,827,349 | 5/1989 | Ogata et al. | 358/256 |
| 4,829,385 | 5/1989 | Takezawa | 358/260 |
| 4,910,505 | 3/1990 | Beaven et al. | 340/750 |
| 4,922,349 | 5/1990 | Abe et al. | 358/443 |
| 5,041,918 | 8/1991 | Ishida et al. | 358/442 |
| 5,086,434 | 2/1992 | Abe et al. | 358/450 |
| 5,113,492 | 5/1992 | Ariki et al. | 395/147 |
| 5,204,946 | 4/1993 | Shimamura | 395/146 |
| 5,253,305 | 10/1993 | Lin | 382/9 |
| 5,307,422 | 4/1994 | Wang | 358/462 |

FOREIGN PATENT DOCUMENTS 62-262543 11/1987 Japan.

*Primary Examiner*—Paul Ip
*Attorney, Agent, or Firm*—Staas & Halsey

[57] ABSTRACT

A mixed mode communication method and apparatus for transmitting mixed mode document data wherein the mixed mode document data is converted into character data only in response to an instruction, and the character data only is transmitted and/or printed out, whereby the transmission time and the print out time can be shortened.

19 Claims, 12 Drawing Sheets

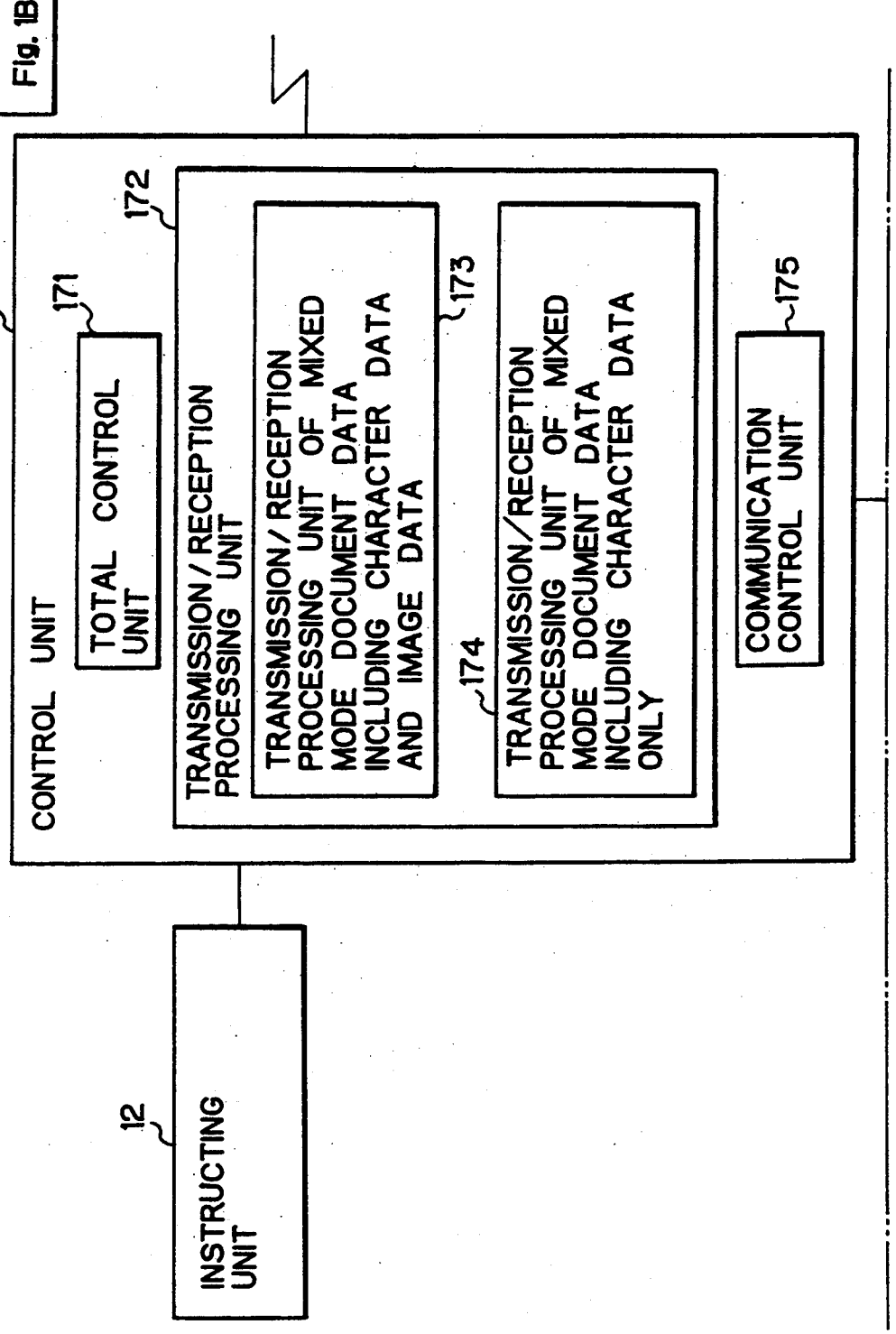

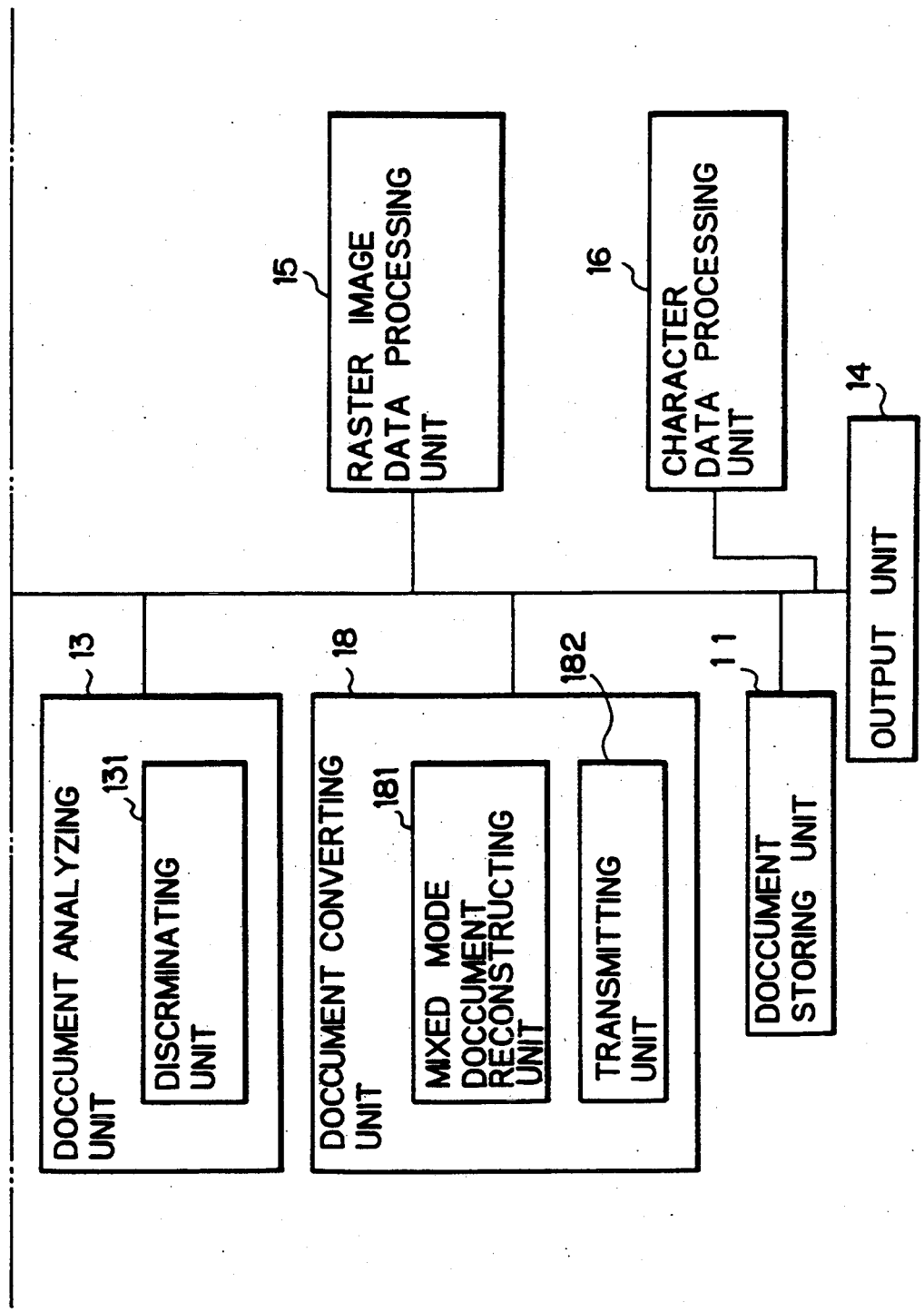

Fig. 2A

OBJECT DESCRIPTION
(OBJECT LAYOUT ROOT)

| OBJECT TYPE : OBJECT LAYOUT ROOT |
| --- |
| OBJECT IDENTIFIER : 0 |
| (OTHER DATA) |
| SUBORDINATES : 1 2 |
| (OTHER DATA) |

Fig. 2B

OBJECT DESCRIPTION
(PAGE)

| OBJECT TYPE : PAGE |
| --- |
| OBJECT IDENTIFIER : 01 |
| (OTHER DATA) |
| SUBORDINATES : 1 2 3 4 5 6 7 8 |
| DIMENSIONS : SIZE OF PAGE |
| (OTHER DATA) |

Fig. 2C
OBJECT DESCRIPTION (BLOCK)

| |
|---|
| OBJECT TYPE : BLOCK |
| OBJECT IDENTIFIER : 0 1 1 |
| (OTHER DATA) |
| COTENT PORTIONS : 0 |
| (OTHER DATA) |
| POSITION : POSITION OF THE BLOCK IN THE PAGE |
| DIMENSIONS : SIZE OF BLOCK |
| (OTHER DATA) |

Fig. 2D
CONTENT PORTION DESCRIPTION

| |
|---|
| CONTENT INDENTIFIER LAYOUT : 0 1 1 0 |
| (OTHER DATA) |
| TYPE OF CODING : CHARACTER |
| (OTHER DATA) |
| CONTENT INFORMATION |

Fig. 2E

DOCUMENT PROFILE DESCRIPTION

| (OTHER DATA) |
|---|
| DOCUMENT APPLICATION PROFILE :<br>{0  0  20  501  0} |
| DOCUMENT ARCHITECTURE CLASS :<br>(FORMATTED DOCUMENT ARCHITECTURE) |
| CONTENT ARCHITECTURE CLASS :<br>{2  8  2  6  0} AND<br>{2  8  2  7  0} |
| (OTHER DATA) |

MIXED MODE COMMUNICATION METHOD AND APPARATUS

BACKGROUND OF THE INVENTION

1. Field of the Invention

The present invention relates to a mixed mode communication method and apparatus for communicating mixed mode document data including both character and image data.

2. Description of the Related Art

Document communication is conventionally performed through either a teletex device, which is a document communication apparatus for character data only or a facsimile device, which is a document communication apparatus for raster image data only. Mixed mode communication, in which mixed mode document data including both character and raster image data can be transmitted and received, was recommended by the International Consultative Committee for Telegraphy and Telephony (CCITT) in 1988 (CCITT recommendation T.501, T.522, T.561).

In general mixed mode document data, however, the amount of raster image data expressing figures in the document is larger than character data, even though the raster image data is typically compressed. Thus, it requires a long time to transmit or print the raster image data.

Generally, the raster image data in the mixed mode data is useful for supplementing an explanation given by characters. However, sometimes the meaning of the contents in the document can be understood even when the raster image data representing figures are deleted from the mixed mode document data. For example, a galley proof document may not need figures represented by the raster image data to be understood. In such a case, it may be unnecessary to transmit the raster image data, and only character data needs to be transmitted. In prior communication devices, however, it is impossible to separate the character data from the raster image data before transmitting the mixed mode document data.

SUMMARY OF THE INVENTION

Accordingly, an object of the present invention is to provide a mixed mode communication method and an apparatus that can transmit character data only, in response to a request to transmit character data only, so as to shorten the transmission and printing time of the document data, and to increase the speed of communication.

To attain the above object, there is provided, according to the present invention, a mixed mode communication method for transmitting mixed mode document data comprising the steps of storing, in a document storing unit, mixed mode document data including character data expressing characters and image data expressing figures, providing instruction to instruct either the mixed mode document data or character data only extracted from the mixed mode document data should be transmitted, discriminating whether the data read from the document storing unit in response to the instruction is character data or image data, converting the mixed mode document data read from the document storing unit into data consisting of character data without image data when the instruction is to transmit character data only, and transmitting the mixed mode document data when the mixed mode document data is instructed to be transmitted, and for transmitting character data only when only character data is instructed to be transmitted.

Preferably, in the above method, the mixed mode document data for each document consists of page data for at least one page and block data for at least one block in each page. The block data for each block includes content information and the type of coding of the content information indicating whether the content information is character data or image data. Preferably, an instruction is provided for each document. The document converting step comprises the steps of discriminating, for each block and based on the type of coding, whether the block data of the mixed mode document data read from the document storing unit is character data or image data, and reconstructing document data with character data only but without image data when the instruction is to transmit character data only, by deleting the image data of each block with reference to the type of coding.

Further preferably, the transmitting step comprises the steps of transmitting mixed mode document data including character data and image data when the instructing means provides instruction to transmit mixed mode document data including both character data and image data, and transmitting the document data reconstructed when the instructing unit provides instruction to transmit document data including character data only.

Still further, preferably, the document data has data structure including object descriptions of a document layout including subordinates relating to pages in the document including subordinates relating to blocks in the page, and a block in the page, and a content portion description including content information and the type of coding of the data in the corresponding block, and when the instructing unit provides instruction to transmit only character data, the discriminating step comprises the step of discriminating whether the type of data in each block is character data or image data, and if the type of data is image data, the subordinate of the block in the object description of the page is deleted by the document reconstructing means, whereby it transmits only the blocks, the subordinates of which remain in the object description of a page.

According to another aspect of the present invention, there is provided a mixed mode communication method for receiving mixed mode document data comprising the steps of storing, in a document storing unit, received mixed mode document data including character data expressing characters and image data expressing figures, providing instruction instructing either the mixed mode document data or character data extracted from the mixed mode document data should be output, discriminating whether the data read from the document storing unit in response to the instruction is character data or image data, converting the mixed mode document data read from the document storing unit into data consisting of character data only without image data when the character data only is instructed by the instructing unit to be output, and outputting the mixed mode document data when the mixed mode document data is instructed to be output or, for outputting character data only when character data only is instructed to be output.

According to a further aspect of the present invention, there is provided an apparatus for carrying out the above described methods.

BRIEF DESCRIPTION OF THE DRAWINGS

The above object and features of the present invention will be more apparent from the following description of the preferred embodiment with reference to the drawings, wherein:

FIGS. 1A and 1B is a block diagram showing a mixed mode communication apparatus according to an embodiment of the present invention;

FIG. 2A is a diagram showing an object description of an object layout root used in an embodiment of the present invention;

FIG. 2B is a diagram showing an object description of a page used in an embodiment of the present invention;

FIG. 2C is a diagram showing an object description of a block used in an embodiment of the present invention;

FIG. 2D is a diagram showing a content portion description of a block used in an embodiment of the present invention;

FIG. 2E is a diagram showing a document profile description used in an embodiment of the present invention;

DESCRIPTION OF THE PREFERRED EMBODIMENT

To understand the background of the present invention, a conventional mixed mode document is first described with reference to FIGS. 7 and 8.

Figure 7:
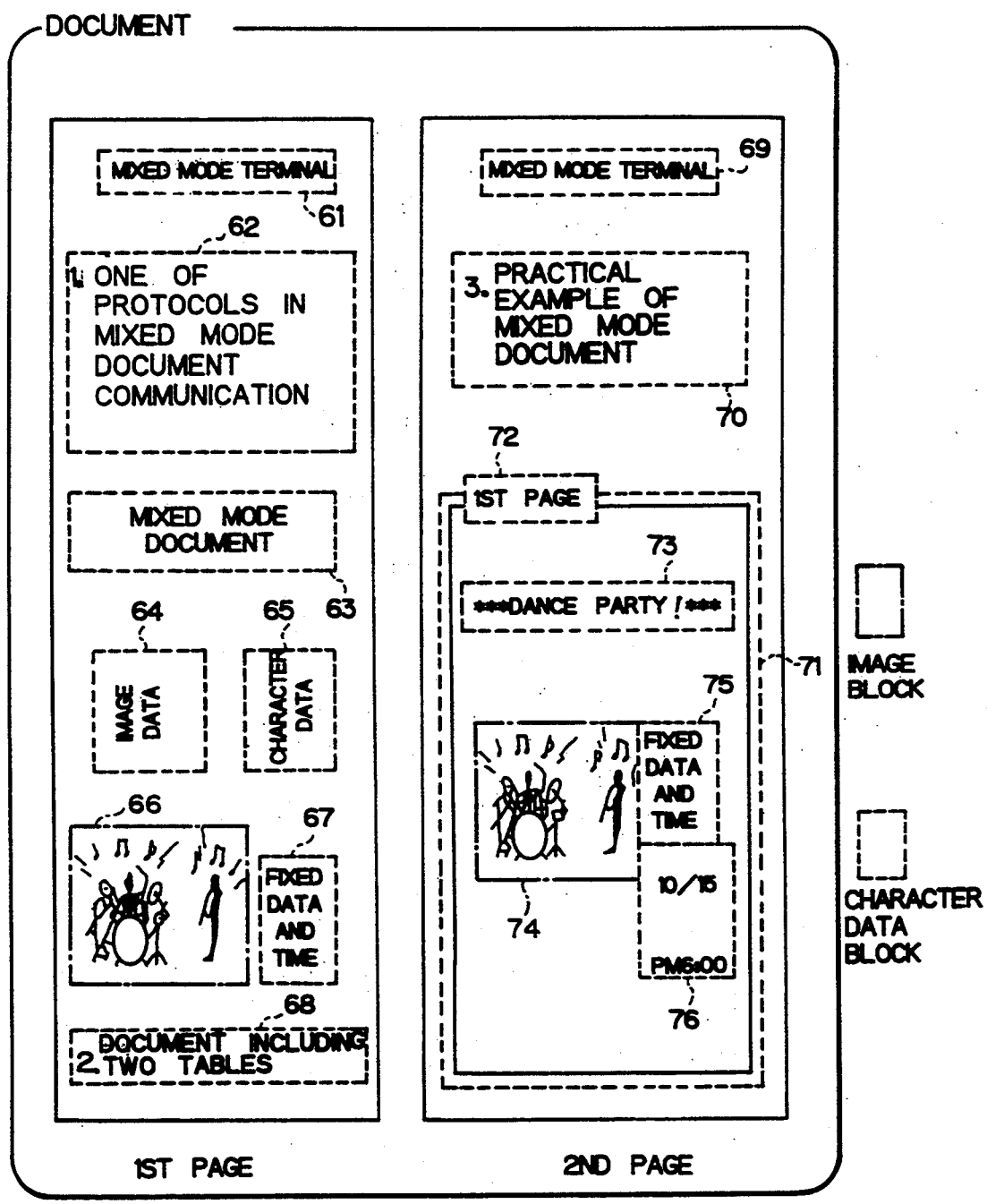
FIG. 7 is a diagram showing a document structure of a conventional mixed mode document.

FIG. 7 is a diagram showing a document structure of a conventional mixed mode document. As shown in FIG. 7, a mixed mode document has a layout constructed by one or more pages. In FIG. 7, a first page and a second page are illustrated as an example. In the first page, there are eight rectangular blocks 61 to 68 containing either characters or images are printed.

Figure 8:
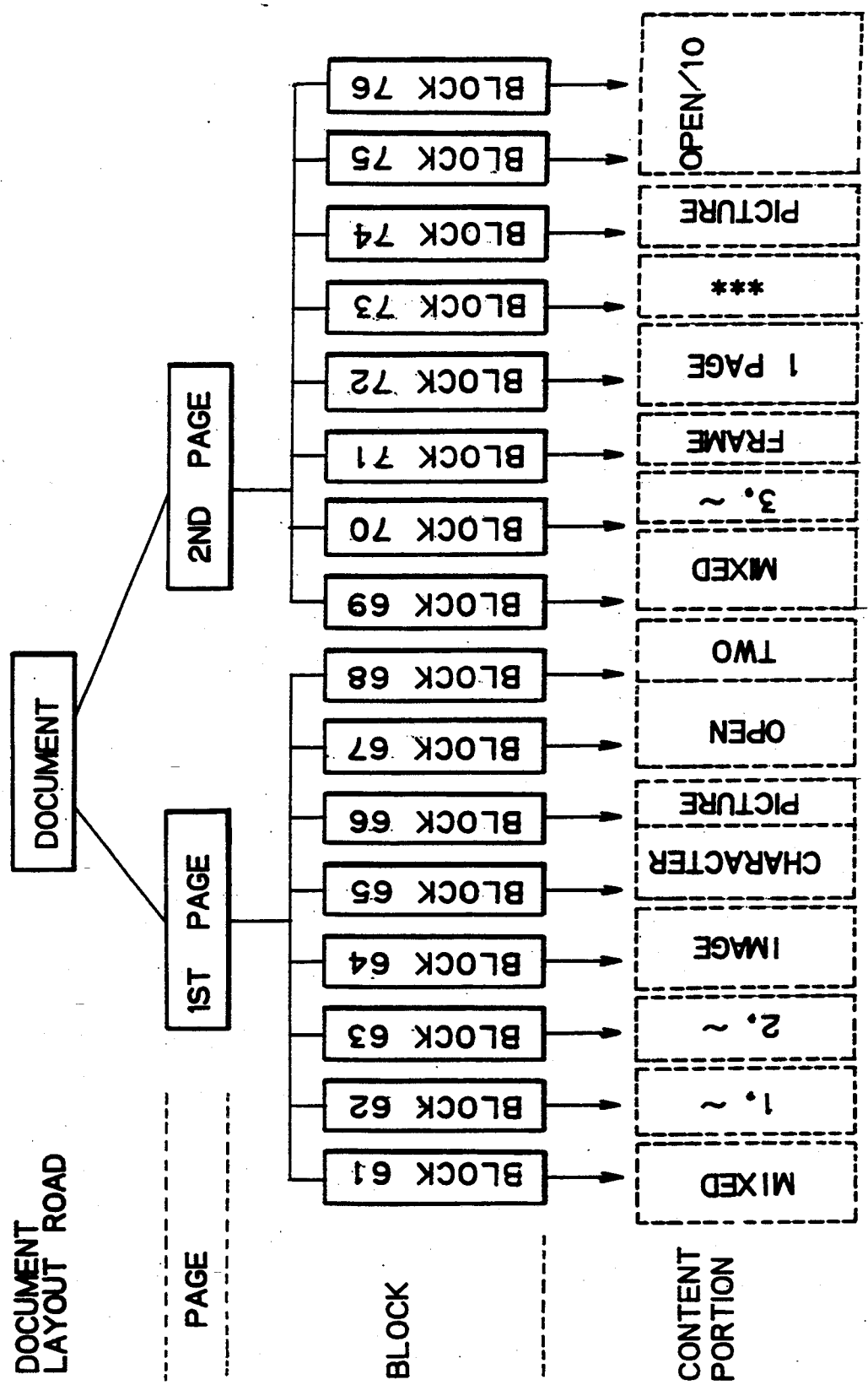
FIG. 8 is a diagram explaining the blocks in the mixed mode document shown in FIG. 7.

FIG. 8 is a diagram explaining the blocks in a mixed mode document as shown in FIG. 7. As shown in FIGS. 7 and 8, blocks 61 to 76, except for blocks 66 and 74, are character data blocks, and blocks 66 and 74 are image data blocks. For example, in the character data block 61, the characters "MIXED MODE TERMINAL" are printed, and in the character data block 62, the characters "1. ONE OF PROTOCOLS IN MIXED MODE DOCUMENT COMMUNICATION" are printed. Similarly in the character data block 63, characters "2. MIXED MODE DOCUMENT" are printed, and in the character data block 64, characters "IMAGE DATA" are printed. In the image data block 66, a picture is printed.

The mixed mode document data, for realizing the mixed mode document as shown in FIG. 7, is constructed by an object layout root, pages, and blocks. The object layout root represents a set of pages in one document. Each page includes one or more blocks, which are the minimum unit of the mixed mode data structure. A block can contain either character data or image data.

To send the mixed mode document data, it is necessary to send character data or raster image data that constitute the contents of the document, and in addition, it is necessary to add object descriptions and a document profile description to the data. There are three object descriptions, i.e., an object description for an object layout root, an object description for a page, and an object description for a block. The object descriptions contain layout information of the object layout root, the page, and the block. In the document communication, character data is typically expressed by one or two bytes of code data, and raster image data is expressed by data preferably compressed in accordance with a known facsimile compression method.

As mentioned before, it requires a long time to transmit the raster image data, and there is a case in which the meaning of the contents of the document can be understood even when the raster image data is deleted from the mixed mode document data.

FIGS. 1A and 1B is a block diagram showing a mixed mode communication apparatus according to an embodiment of the present invention. The apparatus shown in FIGS. 1A and 1B can be used both as a transmitter and a receiver.

In FIGS 1A and 1B, the mixed mode communication apparatus includes a document storing unit 11, for storing the mixed mode data including character data and raster image data, an instructing unit 12 comprising, for example, a keyboard or a communicating unit for instructing, in a mixed mode transmission, either a whole transmission or a character only transmission, a document analyzing unit 13 including a discriminating unit 131 for discriminating whether the data to be transmitted is character data or raster image data, an output unit 14 for printing out a mixed mode document when the mixed mode communication apparatus is used as a receiving apparatus, a raster image data processing unit 15 for coding and decoding compressed image data necessary to effect image data communication, a character data processing unit 16 for converting, when character data is to be printed out at the receiving apparatus, from received character code data to a printed image of dot representation, a control unit 17 including a total control unit 171 for totally controlling the whole system of the apparatus, a transmission/reception processing unit 172 including a mixed mode document transmission/reception processing unit 173 and a character document transmission/reception processing unit 174, and a communication control unit 175, and a document converting unit 18 including a mixed mode document reconstructing unit 181 and a mixed mode document transmitting unit 182 to transmit data to the control unit 17.

When the mixed mode communication apparatus is used as a transmitting apparatus by the instructing unit 12, either a whole transmission or a character only transmission is requested. When a whole transmission is requested, both the characters and the figures are transmitted in accordance with the mixed mode transmission. When a character only transmission is requested, only characters are transmitted in accordance with the mixed mode transmission. It should be noted that, even when character data only is transmitted according to the present invention, the mode of transmission must be the mixed mode transmission in accordance with the recommendation defined by the CCITT.

FIGS. 2A to 2E are diagrams showing three object descriptions, a content portion description, and a document profile description, respectively, as used in the embodiment of the present invention.

FIG. 2A shows an object description of an object layout root. The object type of this object description is "OBJECT LAYOUT ROOT". This means that this description represents a general document structure of a single document. In this description, an object identifier is set to "0", which means that the identification number of this document is "0". In addition, subordinates are described in this object description. The subordinates represent link information with respect to lower order object descriptions relating to pages of the document. One such lower order object description is shown in FIG. 2B. The subordinates, 1, 2, . . . are described in this object description, meaning that this document includes pages 1, 2, . . . When, for example, there are 100 pages in this document, the subordinates in the object description of the object layout root are labeled 1, 2, 3, . . . , 99, and 100. Other data is described in another area of the object description.

FIG. 2B an object description of a page. The object type of this object description is "PAGE". This means that this description represents a structure of one page in the document. In this description, an object identifier set to "0 1", which means that the identification number of this page is "0 1" relating to the subordinate "1" in the object description of the object layout root shown in FIG. 2A. In addition, subordinates are described in the object description of the page. The subordinates represent link information with respect to lower order object descriptions of blocks in the page. One such lower order object descriptions representing a block is shown in FIG. 2C. The subordinates, 1, 2, . . . , and 8 are described in this object description of the page meaning that this page includes eight blocks 1, 2, . . . , and 8. A set of dimensions are described in another column of the object description of the page. The dimensions indicate the size of the page. Other data are also described in the other columns of the object description of the page.

FIG. 2C shows an object description of a block. The object type of this object description is "BLOCK", meaning that this description represents a structure of one block, which, as set forth above, is the minimum unit in the document. In this description, an object identifier is set to "0 1 1", which means that the identification number of this block is "0 1 1" relating to the subordinate "1" in the object description of the page having the object identifier "0 1" shown in FIG. 2B. In addition, there is a column of content portions in which content portion equals "0". The content portion being set to "0" represents link information with respect to a content portion description shown in FIG. 2D. Further, there are columns of positions and dimensions. In the position column, the position of the block in the page is described as in the dimension column, the size of the block in the page is described. In the other columns, other data are described.

FIG. 2D is shown a content portion description is shown. The content portion description corresponds to one block of a page in a document. A content portion description contains, a column of content identifier layouts and a column of types of coding. In the content identifier layout, an identification number of the corresponding block in a page is described. In the illustrated example, the content identifier layout is "0 1 1 0", indicating that the content of the block having the object identifier "0 1 1" and the content portions "0", as shown in FIG. 2C, is described in the content portion description as shown in FIG. 2D. In the content portion description, a column of "TYPE OF CODING" is provided containing a description indicating whether the content information is character data or image data. Other data is described in the other columns. In addition, content information that is the content of data in the block is described in another column. For example, when the content in the block is characters, character data is contained in the content information; and when the content in the block is images, image data is contained in the content information.

FIG. 2E shows a document profile description. The document profile description contains, information identifying the kind of the document. For example, a G4 class 1 document, a mixed mode document, and so forth are known as types of documents. The columns of the document profile description, contain a document application profile, a document architecture class, content architecture class, and other data. In the document application profile, an identifier representing the kind of the document is described. For example, the identifier {0 0 20 501 0} means that this document is a mixed mode document. The document architecture class contains an identifier for representing an architecture class. In the case of a mixed mode document, "formatted" is described, and in the content architecture class, an identifier indicating the type of content information is described. For example, when the content information is data of a mixed mode document, the identifiers {2 8 2 6 0} and {2 8 2 7 0} meaning the formatted character and raster graphics are used. In other columns, other data is described.

The type of coding in the content portion description shown in FIG. 2D is conventionally used in a receiving unit to discriminate whether the received data is character data or image data. In contrast, according to an embodiment of the present invention, the type of coding in the content portion description is used in a transmitting unit to discriminate whether the data to be transmitted is character data or image data.

Figure 3:
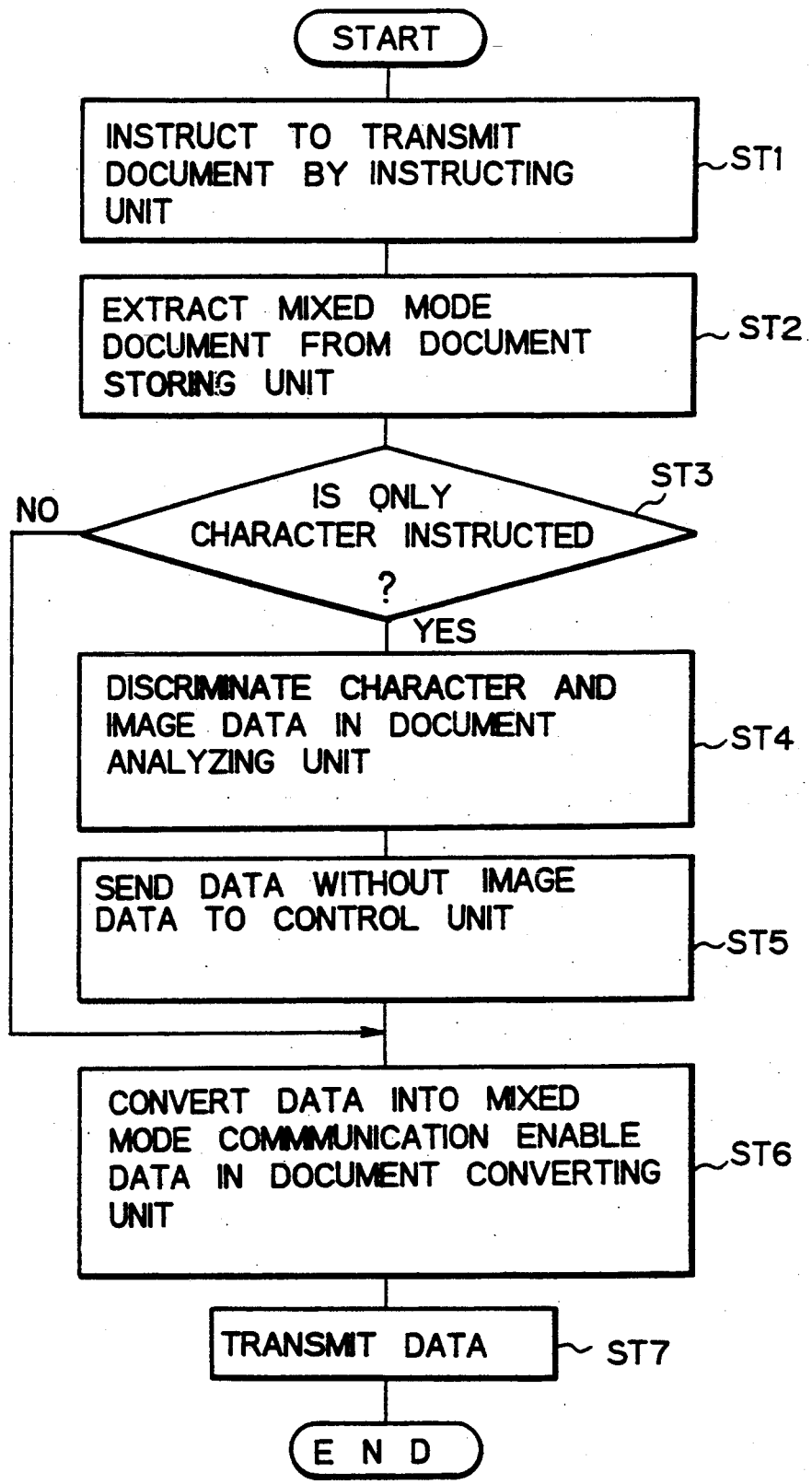
FIG. 3 is a flowchart explaining the transmission process according to an embodiment of the present invention

FIG. 3 shows a flowchart detailing the operation of the mixed mode communication apparatus as shown in FIG. 1, when it is used as a transmission apparatus in which image data is deleted in accordance with a request, according to an embodiment of the present invention.

First, at the instructing unit 12, an instruction is given as to whether the transmission of a document is to be effected as a whole transmission or a character only transmission (ST1). In a whole transmission, both characters and figures are to be transmitted in accordance with the mixed mode transmission. In a character only transmission, only characters are to be transmitted in accordance with the mixed mode transmission.

Then, at step ST2, the control unit 17 extracts the mixed mode document from the document storing unit 11.

At step ST3, the control unit 17 determines whether or not a character only transmission is instructed at the instructing unit 12.

If the answer is NO, i.e., if the whole transmission is instructed, data including both character data and image data are transmitted directly from the document storing unit 11 to the transmission processing unit 173 in the control unit 17 to the transmission processing unit 173 converts the data into mixed mode document data that can be transmitted in accordance with mixed mode communication.

If the answer is YES in step ST2, i.e., if the character only transmission is instructed, then at step ST4, the data including both character data and image data are transmitted from the document storing unit 11 to the document analyzing unit 13 under control of the control unit 17 in. The document analyzing unit 13 determines whether the data from the document storing unit 11 is character data or raster image data.

Then, at step ST5, only character data is sent from the document analyzing unit 13 to the document converting unit 18. In the document converting unit 18, the mixed mode document reconstructing unit 181 reconstructs mixed mode document data, having only character data. Thereafter, the transmitting unit 182 transmits the mixed mode document data having only character data, to the communication control unit 175.

Then, at step ST6, the mixed mode document data, having only character data is converted, in the transmission/reception processing unit 174, into mixed mode document data that can be transmitted in accordance with mixed mode communication.

Then, at step ST7, the mixed mode document data, either having both character data and image data or character data only, is transmitted through a communication line.

Figure 4:
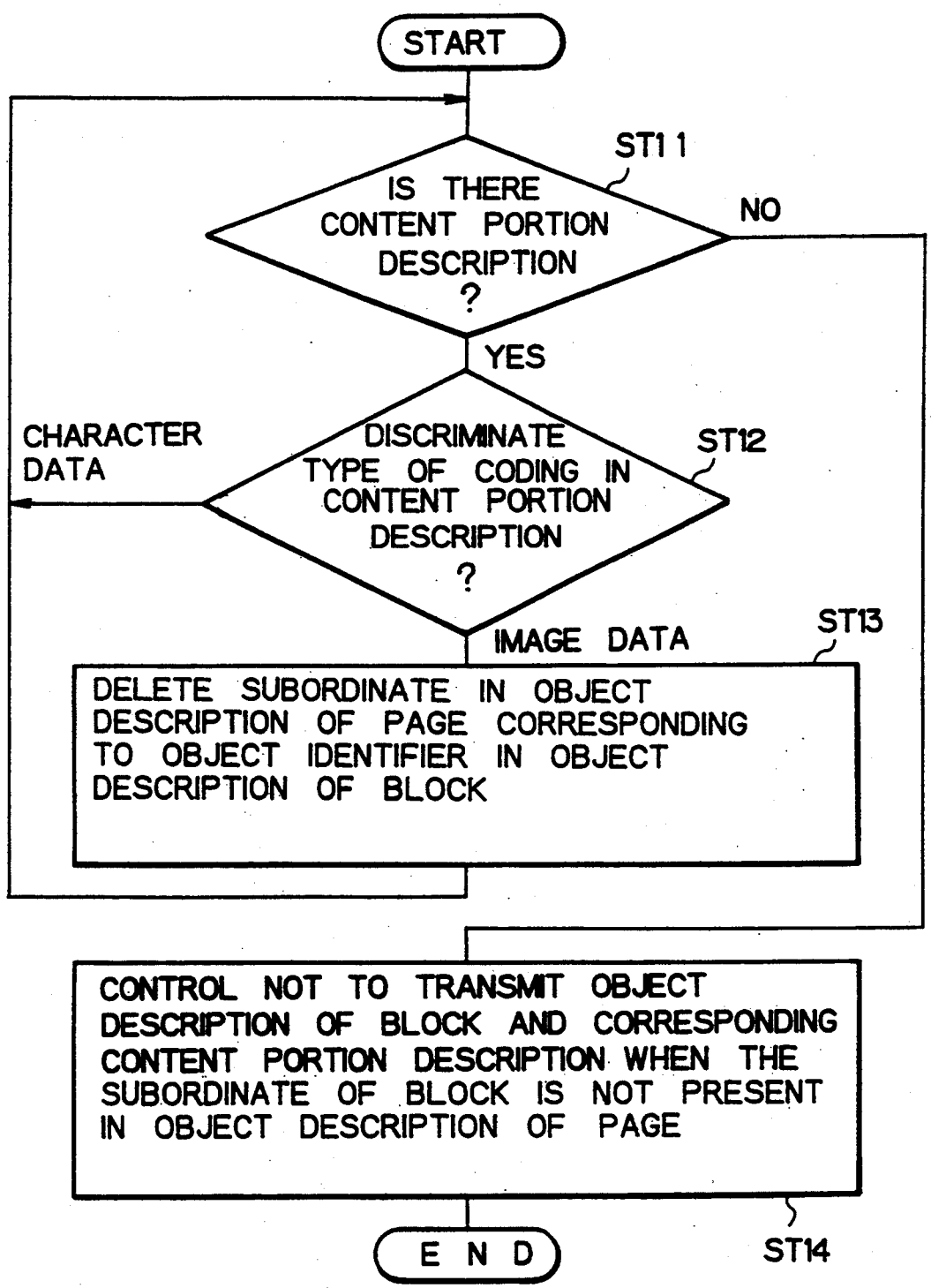
FIG. 4 is a flowchart explaining the process in the document analyzing unit according to an embodiment of the present invention.

FIG. 4 is a flowchart explaining in detail the operation of the steps ST4 and ST5, as shown in FIG. 3. In FIG. 4 at step ST11, the control unit 17 determines whether a content portion description in the document storing unit 11 remains. If there is a content portion description, it means that there are data of at least one block that remains to be processed.

Then, at step ST12, the type of coding in the content portion description is determined in the document analyzing unit 13. If the type of coding is image data, then, at step ST13, in the document converting unit 18, the mixed mode document reconstructing unit 181 modifies the document data by deleting the subordinate in the object description of the page corresponding to the object identifier in the object description of the block. Namely, for example, when the coding type in the content portion description is image data expressed by, for example, "1", the object identifier "0 1 1", for example, in the object description of the block corresponding to the content portion description is used as a key to identify the object description of the page corresponding to the block. Then, in the object description of the page, the corresponding subordinate "1", for example, is deleted. This deleting process is carried out so as to prevent the transmission of the image data in accordance with the instruction given at the instructing unit 12. When all of the content portion descriptions have been processed by repeating the steps ST11 to ST13, then at step ST14, the modified, data including the object descriptions of the object layout root, pages, and blocks, content portion descriptions, and the document profile description, are sent to the transmission/reception processing unit 174 for converting the mixed mode document into an character only document. In the transmission/reception processing unit 174, in the control unit 17, with reference to the received object descriptions of pages, a control is effected so as not to transmit object descriptions of blocks and corresponding content portion descriptions when the subordinates of the blocks are not present in the object descriptions of pages.

Accordingly, since only character data is transmitted from the control unit 17, the amount of data received by a receiving apparatus is small in comparison with the case when mixed mode document data including character data as well as image data is received. As a result, in the receiving apparatus, the receiving unit need not process the image data.

Figure 5:
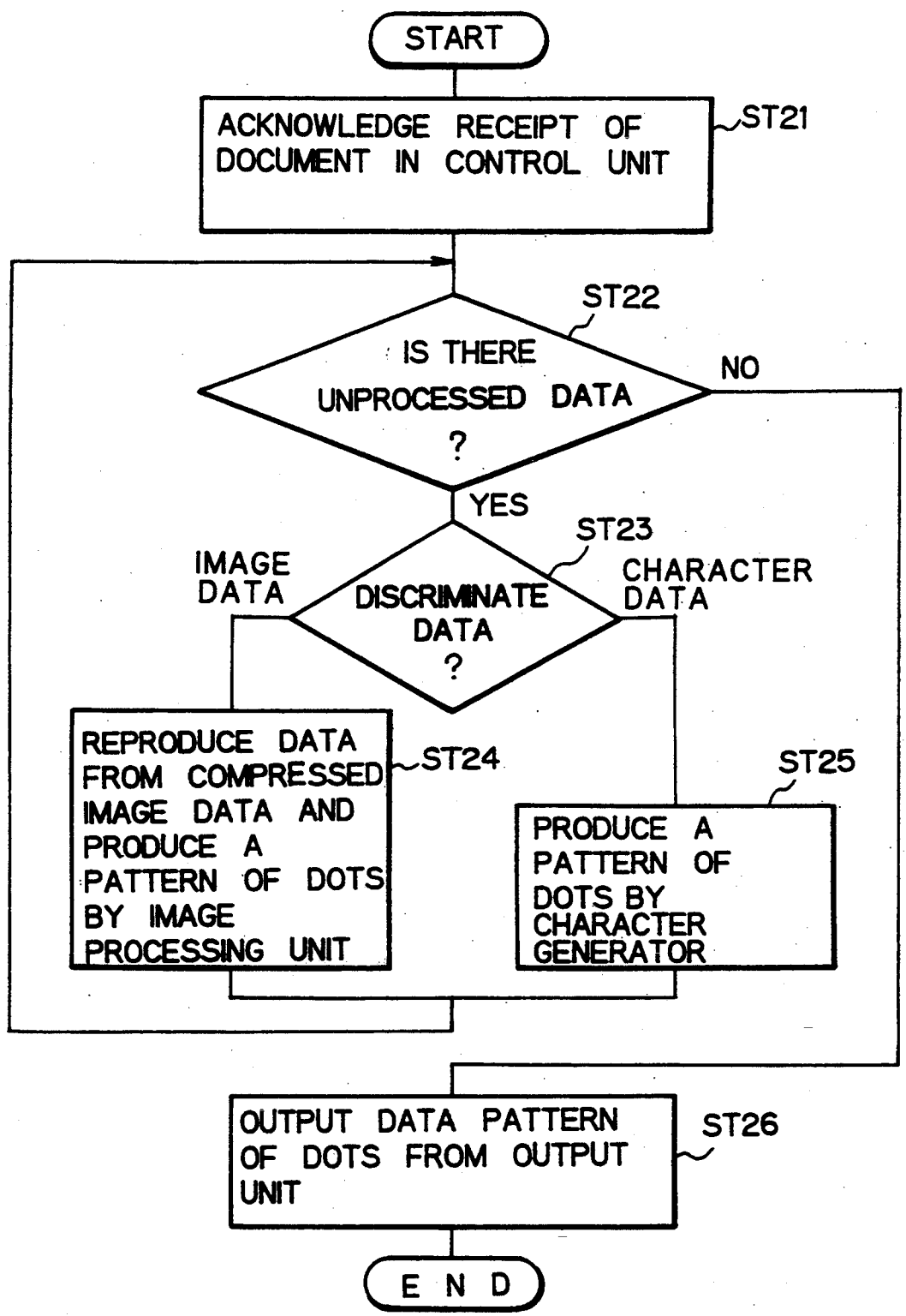
FIG. 5 is a flowchart explaining a receiving process according to an embodiment of the present invention.

FIG. 5 is a flowchart explaining the receiving operation to receive the data including character data only transmitted as described above. In this case, the mixed mode communication apparatus shown in FIGS. 1A and 1B is used as a receiving apparatus. Therefore, the same reference numerals are used for the receiving apparatus.

Each time data of a block in a document is received through a communication line, the control unit 17 in the receiving mixed mode communication apparatus acknowledges, at step ST21, receipt of the document data. Then, at step ST23, the control unit 17 determines whether the received block of data is image data or character data. When the received data is image data, at step ST24, the raster image data processing unit 15 reproduces data from the received compressed image data and produces a pattern of dots to be printed out. When the received data is character data, at step ST25, the character data processing unit 16 or a character generator produces a pattern of dots to be printed out. Conventionally, the received data may include both character data and raster image data even when only character data is necessary at the receiving unit. Therefore, the number of processings in the image data processing unit is large so that the processing time is long even when image data is not necessary at the receiving unit.

In contrast, according to the embodiment of the present invention, there is a case in which, in the received data, character data only is included and image data is deleted from the mixed mode document data in the received data in accordance with instruction given at the instruction unit 12 in the transmitting apparatus. Therefore, the number of processings in the raster image data processing unit 15 is small so that the processing time can be shortened when the image data is not necessary at the receiving apparatus. Namely, when the received mixed mode document data is only character document data, the processing in the raster image data processing unit 15 is not necessary so that step ST24 is not carried out.

When all received data is processed at step ST22, the data of the document reproduced into dots is printed out by the output unit 14 on printing paper.

Accordingly, by using the mixed mode communication apparatus according to the above-described embodiment of the present invention, when mixed mode document data is to be sent, character data only can be transmitted in accordance with a request. Therefore, the amount of data to be transmitted can be reduced so that the transmission time to transmit document data shortened, and the printing time of the received document data is reduced, so that the communication can be carried out at high speed.

The present invention is not restricted to the above-described embodiment, but various modifications are possible without departing from the spirit of the present invention.

Figure 6A:
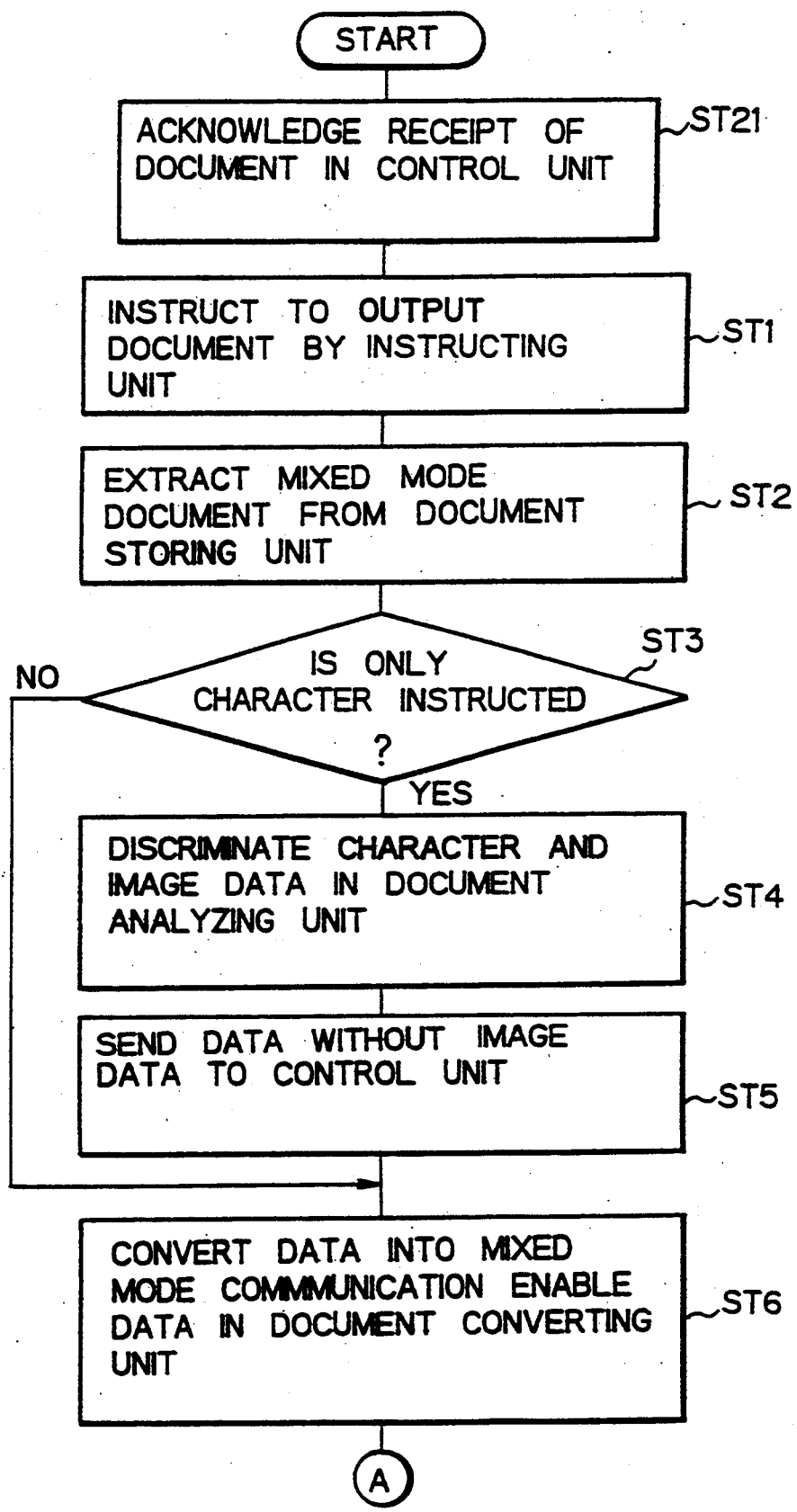
FIGS. 6A and 6B is a flowchart explaining a receiving process according to another embodiment of the present invention.
Figure 6B:
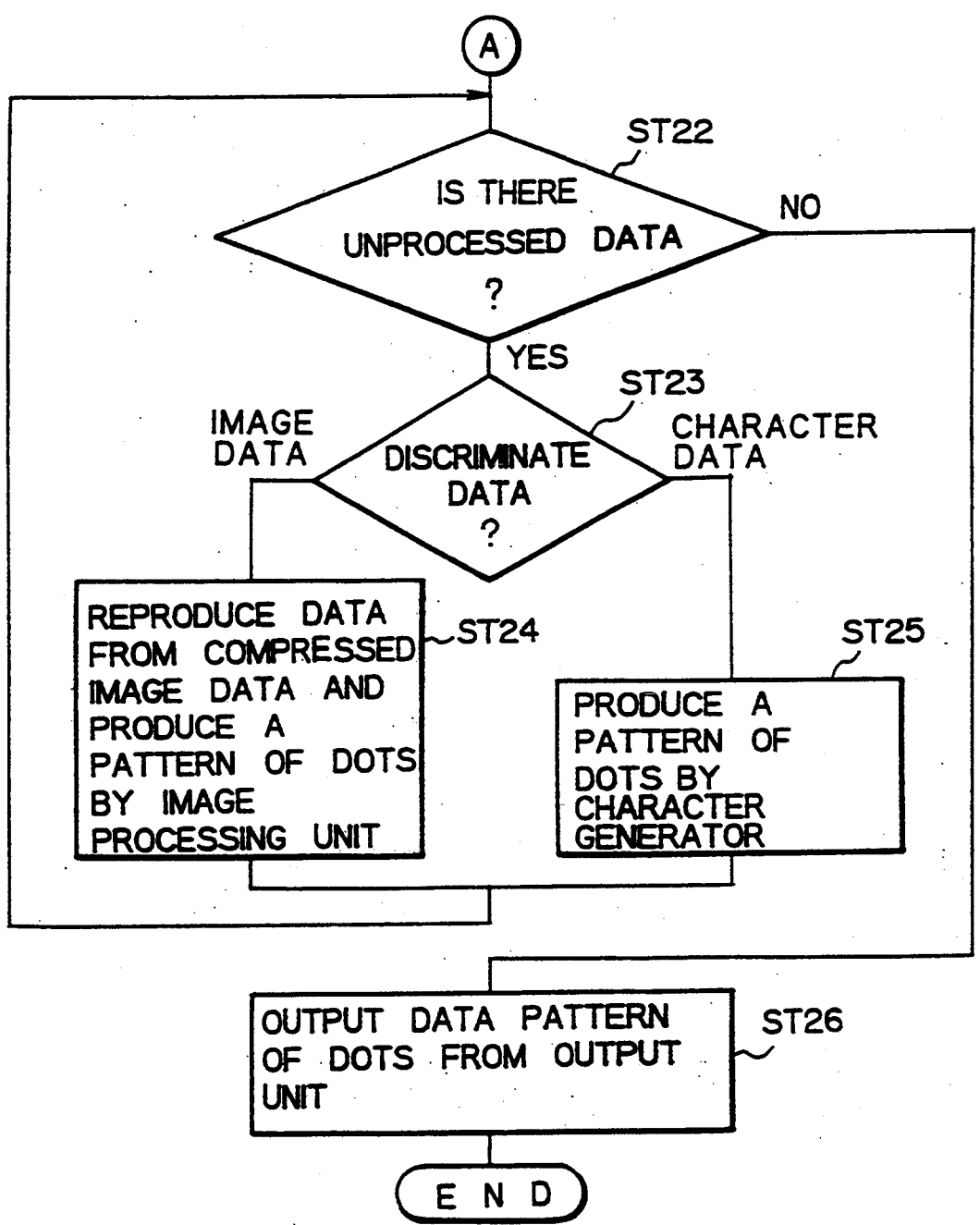

FIGS. 6A and 6B is a flowchart explaining the receiving operation according to another embodiment of the present invention. In this case, the instructing unit 12, the document analyzing unit 13, and the document converting unit 18 are provided in the receiving mixed mode communication apparatus. The only difference between FIG. 5 and FIGS. 6A and 6B is that, in FIGS. 6A and 6B, the steps ST1 to ST6 shown in FIG. 3 are inserted between the steps ST21 and ST22 shown in FIG. 5. Thus, at the instructing unit 12 in the receiving apparatus, when a document is instructed so that character data only is to be printed out, it is possible to delete raster image data from the received mixed mode document data including character data and image data. Then, the document data including character data only is sent to the output unit to be printed out. Thus, the time necessary to process image data can be omitted when the image data is not necessary so that the printing time of the received document can also be shortened.

From the foregoing description, it will be apparent that, according to the present invention, by deleting image data from mixed mode document data, only character data is transmitted in accordance with a request so that transmission time and/or printing time can be shortened, resulting in high speed mixed mode communication.

We claim:

1. A mixed mode communication method for transmitting mixed mode document data comprising the steps of:
    storing, in a document storing means, mixed mode document data including character data expressing characters and image data expressing figures;
    providing instructions that one of said mixed mode document data and character data only, extracted from said mixed mode document data, should be transmitted;
    reading the mixed mode document data from the document storage means;
    identifying the data read from said document storing means as one of character data and image data;
    converting the mixed mode document data read from said document storing means into data consisting of character data only without image data when said instruction is to transmit character data only; and
    transmitting said mixed mode document data when said mixed mode document data is instructed to be transmitted, and transmitting said character data only when said character data only is instructed to be transmitted.

2. A mixed mode communication method as claimed in claim 1, wherein said mixed mode document data for each document comprises page data for at least one page and block data for at least one block in each page; said block data for each block including content information and the type of coding of said content information indicating whether said content information is character data or image data, the mixed mode communication method further comprising:
    providing instructions for each document; and
    said converting step comprises the steps of
        identifying for each block, based on said type of coding, whether said block data of said mixed mode document data read from said document storing means is one of character data and image data; and
        reconstructing document data with said character data only when said instruction is to transmit character data only by deleting said image data of each block.

3. A mixed mode communication method as claimed in claim 2, wherein said transmitting step comprises the steps of transmitting mixed mode document data including character data and image data when an instruction is provided to transmit mixed mode document data including both character data and image data, and transmitting said document data reconstructed when an instruction is provided to transmit document data including character data only.

4. A mixed mode communication method as claimed in claim 3, wherein said document data has a data structure comprising an object description of a document layout having subordinates relating to pages in the document, a description of a page in the document having subordinates relating to blocks in the page, and a description of a block in the page, and a content portion description having content information and the type of coding of the data in the corresponding block; and when an instruction is provided to transmit character data only, said identifying step comprises the step of identifying the type of data in each block as one of character data and image data, and when the type of data is image data, the subordinate of the block in the object description of the page is deleted, whereby only the blocks, the subordinates of which remain in said object description of a page, are transmitted.

5. A mixed mode communication method for receiving mixed mode document data, comprising the steps of:
    storing, in a document storing means, received mixed mode document data including character data expressing characters and image data expressing figures;
    reading the mixed mode document data from the document storage means;
    providing instructions that one of mixed mode document data and character data only extracted from said mixed mode document data should be output;
    identifying the data read from said document storing means in response to said instruction as one of character data and image data;
    converting the mixed mode document data read from said document storing means into data consisting of character data only without image data when said character data only is instructed by said instructing means to output;
    outputting said mixed mode document data when said mixed mode document data are instructed to be output; and
    outputting said character data only when said character data only is instructed to be output.

6. A mixed mode communication method as claimed in claim 5, wherein said mixed mode document data for each document consists of page data for at least one page and block data for at least one block in each page; said block data for each block including data to be output and the type of coding of said data indicating whether said data to be output is one of character data and image data, the mixed mode communication method further comprising:
    providing an instruction for each document; and
    said converting step comprises the steps of:
        identifying for each block based on said type of coding, whether said block data of said mixed mode document data read from said document storing means is one of character data and image data; and reconstructing document data with said character data only without said image data when said instruction is to output character data only, by deleting said image data of each block with reference to said type of coding.

7. A mixed mode communication method as claimed in claim 6, wherein said outputting step comprises the steps of outputting mixed mode document data including character data and image data when an instruction is provided to output mixed mode document data including both character data and image data, and outputting said document data reconstructed when an instruction is provided to output document data including character data only.

8. A mixed mode communication method as claimed in claim 7, wherein said document data has a data structure comprising an object description of a document layout having subordinates relating to pages in the document, a description of a page in the document having subordinates relating to blocks in the page, and a description of a block in the page, and a content portion description having content information and the type of coding of the data in the corresponding block; and when an instruction is provided to transmit character data only, said identifying step comprises the step of identifying the type of data in each block is one of character data and image data, and when the type of data is as one of image data, the subordinate of the block in the object description of the page is deleted, whereby only the blocks, the subordinates of which remain in said object description of a page, are transmitted.

9. A mixed mode communication method as claimed in claim 8, wherein said outputting step further comprises printing out the data to be outputted.

10. A mixed mode communication apparatus for transmitting mixed mode document data, comprising:

document storing means for storing mixed mode document data having character data expressing characters and image data expressing figures;

instructing means for providing an instruction that one of said mixed mode document data and character data extracted from said mixed mode document data should be transmitted;

document analyzing means for identifying the data stored in said document storing means is one of character data and image data;

document converting means for converting the mixed mode document data stored in said document storing means into data consisting of character data only without image data when said instructing means provides an instruction that character data only is to be transmitted; and transmitting means for transmitting said mixed mode document data when said instruction means provides an instruction that mixed mode document data is to be transmitted and transmitting said character data only when said instruction means provides an instruction that character data is to be transmitted.

11. A mixed mode communication apparatus as claimed in claim 10, wherein:

said mixed mode document data for each document comprises page data for at least one page and block data for at least one block in each page;

said block data each block having content information and the type of coding of said content information indicating that said content information is one of character data and image data;

said instructing means providing an instruction for each document; and said document converting means comprises:

document discriminating means for identifying each block based on said type of coding is one of character data and image data; and document reconstructing means for reconstructing document data with said character data only without said image data when said instructing means provides an instruction to transmit character data only by deleting said image data of each block with reference to said type of coding.

12. A mixed mode communication apparatus as claimed in claim 11, wherein said transmitting means comprises mixed mode document data transmitting means for transmitting mixed mode document data including character data and image data when said instructing means provides instruction to transmit mixed mode document data including both character data and image data, and character data only transmitting means for transmitting said document data reconstructed by said document reconstructing means when said instructing means provides an instruction to transmit document data including character data only.

13. A mixed mode communication apparatus as claimed in claim 12, wherein said document data has a data structure comprising an object description of a document layout having subordinates relating to pages in the document, descriptions of a page in the document having subordinates relating to blocks in the page, and descriptions of a block in the page, and a content portion description having content information and type of coding of the data in the corresponding block; and when said instructing means provides an instruction to transmit character data only, said document discriminating means identifies the type of data in each block as one of character data and image data, and when the type of data is image data, the subordinate of the block in the object description of the page is deleted by said document reconstructing means, whereby said transmitting means transmits only the blocks having subordinates remaining in said object description of a page.

14. A mixed mode communication apparatus for receiving mixed mode document data, comprising:

document storing means for storing received mixed mode document data having character data expressing characters and image data expressing figures;

instructing means for providing instruction that one of said mixed mode document data and only character data extracted from said mixed mode document data is to be output;

document analyzing means identifying the data stored in said document storing means as one of character data and image data;

document converting means for converting the mixed mode document data stored in said document storing means into data consisting of character data only without image data, when said instructing means provides an instruction that only character data is to be output; and output means for outputting said mixed mode document data when said instructing means provides an instruction that mixed mode document data is to be output and outputting said character data when said instructing means provides an instruction that only character data is to be output.

15. A mixed mode communication apparatus as claimed in claim 14, wherein:
said mixed mode document data for each document comprises page data for at least one page and block data for at least one block in each page;
said block data for each block having data to be output and the type of coding of said data to be output indicating whether said data to be output is character data or image data;
said instructing means providing an instruction for each document; and
said document converting means comprises:
document discriminating means for identifying each block based on said type of coding, said block data of said mixed mode document data read from said document storing means as one of character data and image data; and
document reconstructing means for reconstructing document data with said character data without said image data, when said instructing means provides an instruction to output character data only, by deleting said image data of each block with reference to said type of coding.

16. A mixed mode communication apparatus as claimed in claim 15, wherein said output means comprises mixed mode document data output means for outputting mixed mode document data having character data and image data when said instructing means provides instruction to output mixed mode document data having both character data and image data, and character data only outputting means for outputting said document data reconstructed by said document reconstructing means when said instructing means provides an instruction to output document data having character data only.

17. A mixed mode communication apparatus as claimed in claim 16, wherein said document data has a data structure comprising an object description of a document layout having subordinates relating to pages in the document, descriptions of a page in the document including subordinates relating to blocks in the page, and descriptions of a block in the page, and a content portion description having content information and type of coding of the data in the corresponding block; and when said instructing means provides instruction to transmit character data only, said document discriminating means identifies the type of data in each block as one of character data and image data, and when the type of data is image data, the subordinate of the block in the object description of the page is deleted by said document reconstructing means, whereby said output means outputs only the blocks having subordinates which remain in said object description of a page.

18. A mixed mode communication apparatus as claimed in claim 17, wherein said output means comprises image data processing means for decoding image data and character data processing means for decoding character data, and only said character data processing means is used to generate output data when said instructing means provides instruction to output character data only.

19. A mixed mode communication apparatus as claimed in claim 18, wherein said output means is a print out means.

* * * * *

UNITED STATES PATENT AND TRADEMARK OFFICE
CERTIFICATE OF CORRECTION

PATENT NO. : 5,432,620
DATED : July 11, 1995
INVENTOR(S) : Chieko WATANABE et al.

It is certified that error appears in the above-indentified patent and that said Letters Patent is hereby corrected as shown below:

Column 3,   line 27, "invention" should be --invention;--;

line 62, "Similarly" should be --Similarly,--.

Column 5,   line 26, "FIG. 2B an" should be --FIG. 2B shows an--;

line 63, "is shown" should be --shows--;

"is" should be deleted;

line 64, "shown" should be deleted.

Column 7,   line 11, "17 in" should be --17--.

Signed and Sealed this

Tenth Day of October, 1995

Attest:

BRUCE LEHMAN

*Attesting Officer*        Commissioner of Patents and Trademarks